3,692,727
POLYTETRAFLUOROETHYLENE DISPERSION COATINGS CONTAINING AMMONIUM CHROMATE OR AMMONIUM CHROMATE-AMMONIUM PHOSPHATE MIXTURE
Norman Duffield Peschko, Haddonfield, N.J., assignor to Pennwalt Corporation, Philadelphia, Pa.
No Drawing. Continuation-in-part of application Ser. No. 794,785, Jan. 28, 1969. This application May 14, 1971, Ser. No. 144,648
Int. Cl. C08f 45/24
U.S. Cl. 260—29.6 F         3 Claims

ABSTRACT OF THE DISCLOSURE

An aqueous dispersion of polytetrafluoroethylene useful for applying a "non-stick" coating to substrates contains from about 2% to about 5% of a soluble salt selected from the group consisting of ammonium chromate and a mixture of ammonium chromate and ammonium phosphate wherein there is at least 0.5 weight percent of the chromate. The salt additive gives the dispersions storage-stability and promotes adhesion of the PTFE coating to the substrate.

---

This application is a continuation-in-part of Ser. No. 794,785, filed Jan. 28, 1969, now abandoned.

This invention relates to improved polytetrafluoroethylene resin coating compositions. More particularly, this invention concerns storage-stable aqueous dispersions of polytetrafluoroethylene containing dissolved therein an effective amount of an ammonium chromate salt or a mixture of ammonium chromate and ammonium phosphate salts.

U.S. Pats. Nos. 2,562,117 and 2,562,118 to Le Verne Kenneth Osdal describe polytetrafluoroethylene coating formulations that have gained wide commercial acceptance for the application of "non-stick" coatings to metallic substrates, compositions comprising aqueous polytetrafluoroethylene dispersions (suspensoids) containing chromic acid or a mixture of chromic acid and phosphoric acid which are applied to metallic or other substrates and cured at elevated temperatures to leave a polytetrafluoroethylene film adhered to the substrate. These acid-containing dispersions are generally referred to as "primers" and the coatings therefrom as "primer-coats" since a second coating (the "top-coat") from a polytetrafluoroethylene dispersion free of acids may be applied over said primer-coat and also cured at high temperatures, especially in the manufacture of "non-stick" cookware.

The above-described, widely used, acid-containing polytetrafluoroethylene (PTFE) dispersions suffer from serious deficiencies relating to their inadequate stability during periods of storage. More specifically, the acid-containing PTFE dispersions tend to increase in viscosity during storage and, at worse, irreversibly coagulate, and require therefore special handling procedures and precautions to avoid coagulation which renders them useless as coating compositions. Moreover, the previously used primers often provide unsuitable coatings when applied to substrates because of their inherent deficiencies. For instance, the PTFE dispersions containing the chromic acid or mixture of chromic and phosphoric acids exhibit an increase in viscosity when stored at room temperature (about 60 to 80° F.) and, in general, eventually coagulate in about 10 to 30 days. The viscosity increase can be retarded and coagulation delayed by storing these dispersions at lower temperatures, e.g., about 35 to 45° F., but even then, storage time is limited to from six to ten months. Moreover, the containers of the refrigerated formulations must be "rolled" about 10 times a week to prevent formation of partly coagulated "seed" particles in the settled solids, which particles hasten degradation and cause imperfections in the coatings prepared from the formulations. If the acid-containing formulations happen to be stored at higher temperatures, e.g., over 80° F. and up to about 130° F., coagulation will occur in a very short time, on the order of about 2 to 5 days. The manufacturers of PTFE dispersions have attempted to avoid instability deficiencies by marketing "two-part" primers in which the acid "accelerator" is kept separate from the rest of the formulation until use is imminent.

It is thus apparent that the inherent instability of the acid-containing, PTFE coating compositions is a nuisance and increases expenses for the manufacturer and the user; close inventory control and limited inventories of formulation are required; refrigeration for storage at low-temperatures is costly; if coagulation of the dispersions does occur, these expensive formulations must be discarded. The composition of the present invention alleviates the foregoing difficulties while unexpectedly offering other advantages as described more fully hereinbelow; the PTFE dispersions embodied herein have outstanding long-term storage stability which is demonstrated by their resistance to viscosity increase and coagulation. For instance, the present dispersions show immaterial viscosity increase (i.e. they retain good fluidity and sprayability) when stored at room temperature for periods of at least about 60 days and up to about 120 days and longer. When the new formulations are stored at elevated temperature, e.g., 130° F., which usually causes rapid coagulation of the acidic PTFE dispersions, fluidity of the new formulations is maintained for at least about 60 days and longer.

British Pat. No. 1,044,654, Oct. 5, 1966, discloses aqueous dispersions of PTFE containing phosphoric acid and/or the ammonium salt thereof but cautions against the addition of chromium compounds thereto. It has now been discovered, however, contrary to these admonitions, that ammonium chromate is beneficial to PTFE suspensions used as coating formulations, not only to provide improved long-term storage stability but to unexpectedly improve the adhesion of PTFE coats to metal substrates applied therefrom.

The composition of this invention is a polytetrafluoroethylene (PTFE) coating formulation in suspension from having improved storage stability and resistance to coagulation, the coatings from which have improved adhesion to metal substrates, consisting essentially of an aqueous dispersion, having a pH within the range of 7 to about 11, of polytetrafluoroethylene particles containing in admixture from about 2% to about 5%, based on the weight of the dispersion, of water-soluble salt selected from the group consisting of ammonium chromate and a mixture of ammonium chromate and ammonium phosphate, there being in the dispersion at least about 0.5 weight percent of the chromate. Although it is advantageous to use as small (but effective) amount of additives as possible to promote good adhesion and to minimize residues in the cured coating, the preferred formulations, to obtain the best balance of dispersion storage stability and good adhesion of the coatings applied therefrom to metallic substrates, contain about 1.2 to 4.5% ammonium chromate, and also preferable is a mixed salts additive which is about 50 to 60 wt. percent chromate and conversely 40 to 50% phosphate.

The aqueous dispersion embodied herein generally contains from about 25 to about 55 percent, and preferably from about 30 to 50 percent, of dispersed polytetrafluoroethylene resin particles, e.g., having average particle sizes within the range of about 0.1 to about 0.5 micron. Such dispersions suitable for coating metallic substrates and the like and the methods of preparing such dispersions are well known to those familiar with the art. The dispersions will normally contain an effective amount of surfactant to stabilize the suspension, generally from about one to about five percent by weight surfactant based on the weight of the suspension. Usually the surfactants present are of the nonionic or anionic types, or mixtures of anionic and nonionic. Representative anionic surface active agents are sodium stearate, potassium laurate, morpholine oleate, sodium lauryl sulfate, potassium lauryl sulfate, sodium 2-ethyl hexyl sulfate, sodium xylene sulfonate, the sodium alkyl benzene sulfonates, sodium naphthalene sulfonate, potassium naphthalene sulfate, sodium alkyl naphthalene sulfonate, potassium alkyl naphthalene sulfonate, sodium sulfonosuccinate, sodium oleic acid sulfonate, sodium castor oil sulfonate, and the like. Nonionic surface active agents are preferred and representative of these are the polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, polyhydric alcohol fatty acid di-, tri-, etc. esters, chloesterol and fatty acid esters, oxidized fatty oils, and the like.

The formulations may be prepared by ammoniating with cooling an aqueous PTFE dispersion containing dissolved chromic acid or a mixture of chromic and phosphoric acids to form the ammonium salts in situ, or, preferably, by preparing the salts in situ by ammoniating an aqueous acid solution and admixing the salt solution with PTFE dispersion. The ammoniation may be accomplished by the addition of either dilute or concentrated aqueous ammonium hydroxide solution or by sparging gaseous ammonia into the PTFE dispersion, or by similar treatments of aqueous solutions of the acids before admixture with the PTFE dispersion. In the alternative, the formulations may be prepared by direct admixture of the essential ammonium salts with the aqueous PTFE dispersion.

The essential ammonium chromate salts embodied in the formulations include, for example, the chromate and dichromate $(NH_4)_2CrO_4$ and $(NH_4)_2Cr_2O_7$. The ammonium phosphate salts include, for example, the hypophosphate $(NH_4)_2H_2P_2O_6$ and the typical orthophosphates $(NH_4)_2HPO_4$ and $NH_4H_2PO_4$. However, any convenient source of chromate ions and mixed chromate-phosphate ions may be employed as a precursor of the ammonium salt. The mixture of chromate and phosphate salts is preferred in the formulations because of the general utility of such mixed salt-containing primers on both ferrous and non-ferrous metal substrates.

The aqueous coating formulations embodied in this invention may be essentially neutral, i.e., having a pH of around 7, or, depending on the amount of ammonia added, may be basic with a pH up to about 11. The basic dispersions are preferred because they have even better stability in storage than the neutral dispersions.

As is known in the art, various finely-divided pigments may be dispersed in PTFE coating formulations, for example, chromium oxide, cadmium lithopones, iron oxides, complex silicates, titanium dioxide, complexes of cobalt, chromium, nickel, titanium or other metals, and the like. The amount of pigment can range from about 1 to about 20 parts by weight per 100 parts by weight of the suspension. The pigment enhances sprayability of the dispersion and aesthetic appeal of the finished coating.

The coating formulations are applied to metallic and other substrates in the usual maner. The substrate is first cleaned by conventional means, for example, steel and aluminum are cleaned by baking at about 750° F., chemical etching, solvent degreasing, sand or grit blasting, or combinations of these operations. The ammonium salt-containing, PTFE dispersion is uniformly redispersed by gentle agitation and applied to the substrate using conventional spray apparatuses such as the Binks Model 18 spray gun with material nozzle 66SS and air nozzle 66SF, the DeVilbiss TGA type gun with No. E90 nozzle, or the Paache CUS 0–9 gun, using 15–45 p.s.i.g. air pressure. Film thicknesses on the order of 0.2 mil to one mil or more can be obtained by one application of coating depending on the composition and total solids in the suspension used. The coating is dried and generally cured by subjecting the coated substrate to temperatures of 690–725° F. for up to one hour, usually about 20 minutes. Longer or shorter cure times or somewhat lower or higher temperatures may be used depending on the intended use or subsequent further treatment of the coated substrate. The ammonium salt not only promotes adhesion of the PTFE coating to the substrate but advantageously decomposes during the curing step into volatile decomposition products before the coatings are fully cured and therefore do not adversely affect the adhesion nor leave any unusual desidues which cause surface imperfections. If desired, a PTFE top-coat can be similarly applied over the foregoing "primer-coat" in the known manner and cured.

In addition to the previously described advantages associated with greater stability, the compositions of the present invention unexpectedly provide better coatings than the prior art formulations. The cured coatings have greater impact resistance and better adhesion to aluminum. There are fewer surface imperfections (commonly referred to as "mud cracks" and "pits"). In this regard, the incorporation of ammonium salts in the formulations is critical since other salts as alkali metal salts, e.g., sodium and potassium salts, leave water-soluble chromates, phosphates, etc. in the coating which cause discontinuities in the coating when it is exposed to an aqueous environment that will dissolve these residues.

The following examples are set forth to illustrate the invention and to demonstrate the improvements obtained therewith. The aqueous tetrafluoroethylene polymer dispersion used in the examples was comprised of 55% dispersed PTFE resin particles (particle sizes on the order of 0.2 to about 0.4 micron) and 6.2% of dissolved nonionic surfactant ("Triton X–100," an octylphenoxy ethanol in which the polyoxyethylene chain is 9–10 units in length). Aqueous coating formulations were prepared as described below and tested for storage stability characteristics and performance as substrate coatings. The formulations were comprised of about 45 to 47% water, 42% polytetrafluoroethylene particles, 4.7% pigment, 4.6% surfactant, and other ingredients in minor proportions as set forth. In the examples the amounts of constituents in the compositions are in parts by weight.

Example 1.—Mixed acid coating formulation 23.5 parts of pigment ["pure green" chromic oxide $(Cr_2O_3)$ J 5310, Mineral Pigment Corporation, Muirkirk, Md.] is dispersed in a solution of 5.5 parts 85% $H_3PO_4$ and 5.5 parts $CrO_3$ in 83 parts water. This mixture is gently blended with 382.5 parts of the aqueous polytetrafluoroethylene dispersion described above. The pH of the resulting formulation is about 4.

Example 2.—Neutral mixed salt-containing coating formulation

To a solution of 5.5 parts 85% $H_3PO_4$ and 5.5 parts $CrO_3$ in 51.9 parts water, 31.1 parts of aqueous 5 N $NH_4OH$ is added slowly with agitation and cooling to give a solution pH of 7. Then 23.5 parts of the aforesaid pigment is dispersed in the solution, followed by the gentle mixing therewith of 382.5 parts of the aforesaid polytetrafluoroethylene dispersion.

Example 3.—Basic mixed salt-containing coating formulation

To a solution of 5.5 parts 85% $H_3PO_4$ and 5.5 parts $CrO_3$ in 43.3 parts water is added 31.1 parts of 5 N $NH_4OH$ and then 8.6 parts concentrated (58%) $NH_4OH$ to give a solution pH of about 11. 23.5 parts of pigment are dispersed in the solution and this is mixed with 382.5 parts of the aforesaid PTFE dispersion.

Samples of the foregoing formulations are stored at room temperature and also at the elevated temperature of 130° F. Acid-containing Formulation 1 becomes increasingly viscous and coagulates after 9 days storage at room temperature and after about 2 days storage at 130° F. while salt-containing Formulations 2 and 3 are still fluid, and in fact slightly less viscous than when storage began, even after 90 days of storage under any of the conditions.

The formulations are sprayed onto sand-blasted, steel and aluminum "Q panel" substrates which had been cleaned and baked at 750° F. (standard 4" x 12" panels of 1010 cold rolled steel and 3003 H 18 aluminum, Q Panel Company). The coatings (0.8 mil to 1.0 mil thick) are cured for 20 minutes at 690° F. Standard adhesion tests ("Byk-Gulden Cross Cut Test" and "Mandrel Bend Test," ASTM D522–60) show that adhesions in all cases, as well as impact resistance ("Gardner Reverse Impact Test") and hardness by standard test methods, are excellent. However, the coatings from Formulations 2 and 3 have fewer surface imperfections than those from Formulation 1; for instance, compared to Formulation 1, Formulation 2 gives about 25% less mud cracks on steel and 75% less mud cracks on aluminum, and Formulation 3 gives about 50% less mud cracks on steel and 67% less on aluminum.

The sprayability of Formulations 2 and 3 remains good with storage. Viscosity measurements of the dispersions at the time of preparation give a value of 352 cps. for the neutral formulation (Example 2) and 514 cps. for the basic formulation (Example 3). After storage periods of 6 days and 43 days at room temperature, the viscosities are 330 cps. and 340 cps. for Formulation 2, and 368 cps. and 360 cps. for Formulation 3, respectively. After about 80 days storage at room temperature, both formulations have viscosities between 500 and 600 cps. The dispersions subjected to said storage periods are used for coatings (0.5 to 0.8 mil thick) on sandblasted steel "Q panels," which coatings are cured for 20 minutes at 690° F. Adhesion, hardness, impact and other properties of the coatings are excellent. Moreover, it is found that the coatings improve with the older dispersions which surprisingly produce fewer mud cracks and pits. When the foregoing formulations are used as primer coats for steel and aluminum, cured as described, and then a topcoat is applied thereto (using an aqueous polytetrafluoroethylene dispersion comprised of about 35 weight percent polytetrafluoroethylene particles, 9 weight percent of chromium tetrahydrate green pigment, 1.0 weight percent of an anionic emulsifying agent, 5.0 weight percent toluene, 1.0 weight percent of a non-ionic surfactant and the balance water with optional small amounts of additives such as antifoaming agents) and cured at 725° F. for 40 minutes, the quality of the coatings is high, e.g., having good impact resistance, adhesion and hardness with insignificant mud cracks and pits.

Example 4.—Neutral mixed salt-containing coating formulation 8.4 parts $(NH_4)_2CrO_4$ and 5.3 parts $NH_4H_2PO_4$ are dissolved in 80.3 part water. This solution is mxed with 23.5 parts pigment and 382.5 parts of the polytetrafluoroethylene dispersion used in the previous examples.

Example 5.—Basic mixed salt-containing coating formulation

Five parts concentrated (58%) aqueous $NH_4OH$ solution is added to a solution of 8.4 parts $(NH_4)_2CrO_4$ and 5.3 parts $NH_4H_2PO_4$ in 75.3 parts water to give a solution pH of about 11. This salt solution is mixed with the polytetrafluoroethylene dispersion and pigment as in the previous example.

The coating characteristics and storage stabilities of Formulations 4 and 5 are tested as in the previous examples, and their properties and quality are found to be essentially the same as for Formulations 2 and 3.

Example 6.—Single acid-containing formulation 23.5 parts pigment and 382.5 parts of the aqueous PTFE dispersion are mixed with a solution of 11.8 parts of 85% $H_3PO_4$ in 82.2 parts water. Coatings applied using this formulation on steel are unacceptable, having inferior and inadequate adhesion and reverse impact resistance.

Example 7.—Single acid-containing formulation 23.5 parts pigment and 382.5 parts of aqueous PTFE dispersion are mixed with a solution of 10 parts $CrO_3$ in 84 parts water. This formulation demonstrates inadequate storage stability by coagulating after standing for less than about 14 days at room temperature.

Example 8.—Single salt-containing formulation 23.5 parts pigment and 382.5 parts PTFE dispersion are mixed with a salt solution of 11.8 parts 85% $H_3PO_4$ in 61.8 parts water made neutral by the addition thereto of 20.4 parts 5 N aqueous $NH_4OH$.

Example 9.—Single salt-containg formulation 23.5 parts pigment and 382.5 parts PTFE dispersion are mixed with a salt solution of 10 parts $CrO_3$ in 42.2 parts water neutralized with 40 parts 5 N $NH_4OH$ solution.

The storage stabilities of Formulations 8 and 9 are comparable to those of the mixed salt-containing Formulations 2 and 3. One-mil cured coatings on steel and aluminum Q-panels from Formulations 8 and 9 have good hardness and reverse impact resistance and good surface quality but the adhesion of the coating made from the ammonium chromate-containing formulation is surprisingly very much superior to that of the coating from the ammonium phosphate-containing formulation free of chromate, which is confirmed by the tests summarized in the next example.

Example 10.—Detailed adhesion tests

Aqueous PTFE dispersion formulations are prepared as in the previous examples containing the amount of PTFE resin particles, surfactant, and pigment as above mentioned, and chromate and/or phosphate additives as specified below. Standard adhesion tests are carried out on coatings applied to etched aluminum and cured at 380° C. The results are tabulated in the following table.

The results show that the coating compositions of the invention (Examples (e) and (f)) provide coatings having generally superior adhesion except in the case of the mixed acids formulation, Example (c). But although this latter composition gives good adhesion, the coatings are inferior, i.e. more surface imperfections (see Example 1) and, moreover, the shelf-life of formulation (c) at room temperature (i.e. resistance to coagulation) is only 9 days compared to from more than a month to greater than 3 months for the formulations of the invention.

| Ex. | Additive | Amount, percent | Coating thickness, mil | Thumbnail test | Tape test on cross-cut[1] | Reverse impact, inch-pounds[2] | Conical mandrel bend[3] | HCl test, minutes for adhesion loss[4] |
|---|---|---|---|---|---|---|---|---|
| (a) | $H_3PO_4$ | 2 | 1.0 | Good | Ragged cut, 50% removed | <20 | 4″ failed[5] | 77 |
| (b) | $CrO_3$ | 2 | 0.8 | Fair | Ragged cut, 0% removed | [6] 20 | 2″ failed | 82 |
| (c) | $H_3PO_4$ and $CrO_3$ | 1.8 2.2 | 0.6 | Excellent | Clean cut, 0% removed | 20 | ½″ failed | ca. 100 |
| (d) | $(NH_4)H_2PO_4$ | 2.4 | 0.8 | Poor | do | <20 | 4″ failed | 65 |
| (e) | $(NH_4)_2CrO_4$ | 3.0 | 9 | Good | Slightly ragged cut, 0% removed | [6] 20 | ½″ failed | 87 |
| (f) | $(NH_4)H_2PO_4$ and $(NH_4)_2CrO_4$ | 2.1 3.3 | 0.7 | Excellent | do | 20 | do | ca. 100 |

[1] Byk-Gulden Cross Cut, cuts coating into 1/16″ squares to substrate.
[2] Gardner Heavy Duty Impact Tester.
[3] ASTM D522-60.
[4] Exposure to 15% HCl at room temperature.
[5] 4″ is entire panel width.
[6] Slight failure.

I claim:

1. A polytetrafluoroethylene coating formulation in suspension form having long-term storage stability and resistance to coagulation consisting essentially of an aqueous dispersion of polytetrafluoroethylene particles containing in admixture from about 2% to about 5%, based on the weight of the dispersion, of water-soluble salt selected from the group consisting of ammonium chromate and a mixture of ammonium chromate and ammonium phosphate, there being in the dispersion at least about 0.5% of ammonium chromate.

2. A dispersion according to claim 1 containing from about 1.2% to 4.5% ammonium chromate.

3. A dispersion according to claim 1 wherein the mixture of salts consists of about 50 to 60 wt. percent ammonium chromate and correspondingly from 40 to 50% of ammonium phosphate.

References Cited

UNITED STATES PATENTS

| 2,562,117 | 7/1951 | Osdal | 260—29.6 F |
| 2,562,118 | 7/1951 | Osdal | 260—29.6 |
| 3,202,626 | 8/1965 | Fitzsimmons et al. | 260—29.6 |
| 3,489,595 | 1/1970 | Brown | 260—29.6 |

FOREIGN PATENTS

| 1,044,654 | 10/1966 | Great Britain. |

HAROLD D. ANDERSON, Primary Examiner

U.S. Cl. X.R.

117—161 UZ; 260—29.6 MM, 29.6 MP